Jan. 6, 1925.
W. E. WILSON
BEAD PLACING RING
Filed Dec. 21, 1921
1,521,850
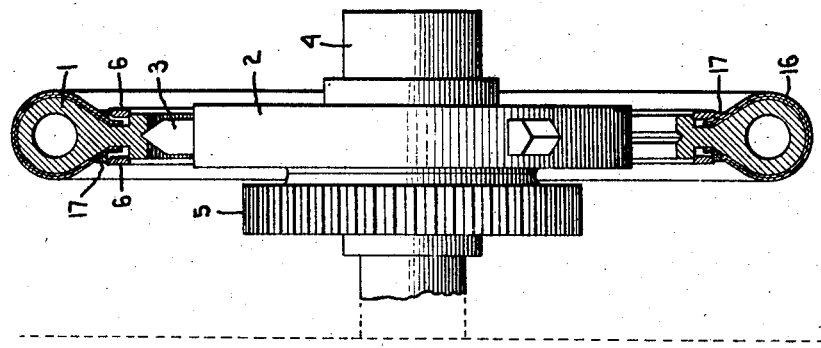
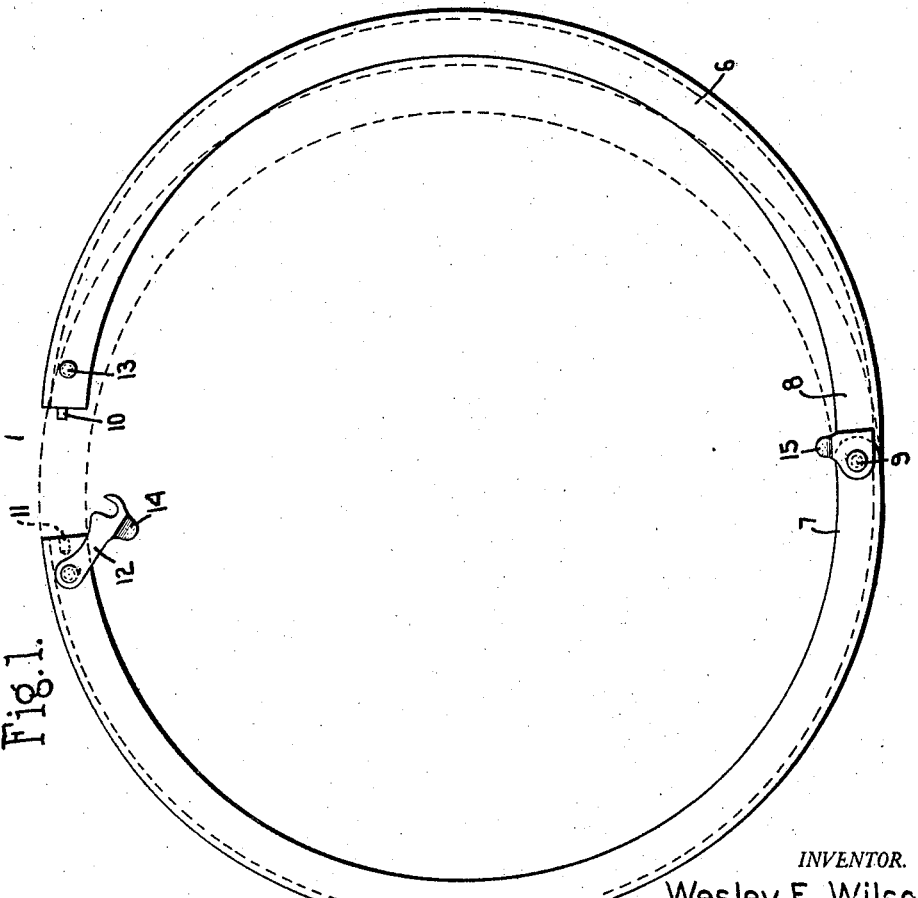
INVENTOR.
Wesley E. Wilson
BY
ATTORNEY.

Patented Jan. 6, 1925.

1,521,850

UNITED STATES PATENT OFFICE.

WESLEY E. WILSON, OF AKRON, OHIO.

BEAD-PLACING RING.

Application filed December 21, 1921. Serial No. 523,847.

*To all whom it may concern:*

Be it known that I, WESLEY E. WILSON, a citizen of the United States, residing at Akron, in the county of Summit, State of Ohio, have invented certain new and useful Improvements in Bead-Placing Rings, of which the following is specification.

This invention relates to the art of tire building particularly to the art of building pneumatic tires, being designed for the purpose of carrying or centering a bead on a tire core in the process of building a tire.

Heretofore in the art of tire building, it has been the practice to provide a continuous or endless ring for the purpose of carrying the bead and centering it on the tire. As the tire is built up on a metallic core which is usually supported on the projecting end of a shaft from the tire building machine, or upon the spindle of a core stand, this has necessitated the use of two bead placing rings in the manufacture of a tire, the one for the inner bead having to be placed over the shaft before the core is mounted on the chuck, or it has meant the dismounting of the core from the chuck or spindle when the operator is ready to put the inside bead in place and a second dismounting and remounting of the core after the bead is in place so that the ring can be available for the outer bead.

The purpose of my invention is to design a type of bead placing ring which can be placed over the shaft or spindle supporting the core, without the removal of the core. A further object of the invention is to provide a ring for this purpose which can be closed and locked in true circular form so as to provide an accurate centering means for the bead, and can be opened to allow it to be passed over the shaft of the core.

In the drawing accompanying this application is shown one embodiment of the invention, it being understood that the showing is for the purpose of enabling one skilled in the art to practice the invention and is not for the purpose of limiting the invention to exactness in detail or arrangement of the parts.

In the drawings:

Fig. 1 is a side elevation of the bead placing ring showing the manner in which it may be opened.

Fig. 2 is a sectional view through a core mounted upon a chuck showing the manner of applying the ring to the core.

In the drawings, 1 represents a core, which may be of any preferred or standard type, the core being shown as mounted upon any of the usual forms of core chucks, the expansible arms 3 of which engage the inner circumference of the core to hold it in position. The chuck is mounted on the projecting end of a shaft or spindle 4, and may be driven by a gear 5, if used on a tire building machine. It will be evident that the continuous bead ring of the prior art cannot be placed on the inner or machine side of the core, while it is mounted on the chuck.

The improved bead ring is shown in Fig. 1, being indicated in general by the numeral 6. This bead ring is in two parts 7 and 8, which, may, for example, each constitute one-half of the ring, although of course, the division point may be located at any suitable point about the ring.

At one point the parts 7 and 8 are joined by a pin or hinge 9 so that the other ends of the ring may be spread to pass over the shaft. At the other end of the part 8, there is provided a projecting pin 10 which is adapted to fit into a socket 11 in the part 7, so that the ends of the two parts are properly aligned when the ring is in circular condition. A swinging catch 12 is located on the free end of one half of the ring which is designed to take over a pin 13, on the other part to hold the two portions of the ring together in a true circle as shown in dotted lines in Fig. 1.

The latch 12 may be provided with a lug or boss 14 and a similar lug or boss 15 may be placed at the pin 9, these bosses serving as a means to pry the bead from its seat after the bead is placed in position.

The operation will be readily understood. When the under bead plies 16 have been laid over and shaped upon the core it is ready to receive the bead 17. The bead ring is now opened and passed over the shaft after which the ends are brought together and latched restoring the ring to circular condition. The bead is now passed over the core, and may be applied to the tire by the ring. After the bead has been located by the ring, the latter may be taken off the shaft and restored to true circular form, whereupon it can be used to place the outer bead.

I have shown in Fig. 2 a bead ring suitable for a type of core in which there is an enlarged tongue or flange, on the inner circumference. It will be understood that the bead ring may be changed in form or proportion to fit any type of core without affecting the principles of my invention, which comprises the provision of means by which a bead ring may be opened to pass over a core shaft and restored to true circular form, so as to enable the bead ring to be placed on and taken off a core while it is mounted on the chuck or other core holding means.

Claims:

1. A bead placing ring for use in tire manufacture, comprising two portions, means to connect the two portions at one point so as to permit an open gap between the ends of the ring and means to hold the two portions together in a true circular formation.

2. A bead placing ring for use in tire manufacture said ring being split at two points, a hinge connection between the two portions of the ring at one point and a locking device at the other point to maintain the ring in true circular condition.

3. A bead placing ring for use in tire manufacture, said ring being split so as to allow the ends to spread to pass over a core shaft and means to unite the ends of the ring together at the split.

4. A bead placing ring for use in tire manufacture, said ring being split so as to allow it to pass over a core shaft and means to aline the ends of the ring in contact with one another to prevent accidental spreading.

5. A bead placing ring for use in tire manufacture, said ring being split to allow the ends to spread and pass over a core shaft, a projection on one end of the ring and a recess on the other end of the ring to aline the ends of the ring.

6. A bead placing ring for use in tire manufacture, said ring being split to allow the ends to spread and pass over a core shaft, a projection on one end of the ring, a recess on the other end of the ring to aline the ends of the ring, and means to fasten the ends of the ring together.

7. A bead placing ring comprising two portions which when placed together form a true circle, a hinge connection between the two portions and a latching device to hold the ends of the ring together.

WESLEY E. WILSON.